US009158860B2

(12) United States Patent
Markovich et al.

(10) Patent No.: US 9,158,860 B2
(45) Date of Patent: Oct. 13, 2015

(54) INTERACTIVE QUERY COMPLETION TEMPLATES

(71) Applicant: Google Inc., Mountain View, CA (US)

(72) Inventors: Yosi Markovich, Tel-Aviv (IL); Sean Liu, El Dorado Hills, CA (US); Jack Wright Menzel, Mountain View, CA (US)

(73) Assignee: GOOGLE INC., Mountain View, CA (US)

( * ) Notice: Subject to any disclaimer, the term of this patent is extended or adjusted under 35 U.S.C. 154(b) by 237 days.

(21) Appl. No.: 13/779,463

(22) Filed: Feb. 27, 2013

(65) Prior Publication Data
US 2013/0226953 A1    Aug. 29, 2013

Related U.S. Application Data

(60) Provisional application No. 61/605,014, filed on Feb. 29, 2012.

(51) Int. Cl.
*G06F 17/30*    (2006.01)
*G06F 7/00*    (2006.01)

(52) U.S. Cl.
CPC ........ *G06F 17/3097* (2013.01); *G06F 17/3064* (2013.01)

(58) Field of Classification Search
CPC .......... G06F 17/3064; G06F 17/30867; G06F 17/30864; G06F 17/30672; G06Q 30/02
USPC .................. 707/765, 766, 767, 779
See application file for complete search history.

(56) References Cited

U.S. PATENT DOCUMENTS

| 8,612,414 B2* | 12/2013 | Lee et al. ........... 707/706 |
| 2005/0283468 A1 | 12/2005 | Kamvar et al. |
| 2008/0148174 A1 | 6/2008 | Read |
| 2008/0183698 A1* | 7/2008 | Messer et al. ........ 707/5 |
| 2012/0265779 A1* | 10/2012 | Hsu et al. ........... 707/767 |

FOREIGN PATENT DOCUMENTS

| WO | 9966378 | 12/1999 |
| WO | 0180079 | 10/2001 |
| WO | WO 2013015811 A1 * | 1/2013 |

OTHER PUBLICATIONS

International Search Report and Writen Opinion of corresponding PCT Serial No. PCT/us2013/028055. May 8, 2013.

* cited by examiner

*Primary Examiner* — Sherief Badawi
*Assistant Examiner* — Raquel Perez-Arroyo
(74) *Attorney, Agent, or Firm* — Middleton Reutlinger

(57) ABSTRACT

Methods, systems and apparatus are described herein that includes identifying a partial query entered into a search field. A query completion template is then provided for display for a category of information associated with one or more terms within the partial query, the query completion template including an interactive field that is user editable. User interaction with the interactive field is the identified. Display of the query completion template is then updated to include the results of the user interaction within the interactive of the query completion template. User selection of the updated query completion template is then identified, and in response the updated display of the query completion template is transmitted as a search query.

27 Claims, 8 Drawing Sheets

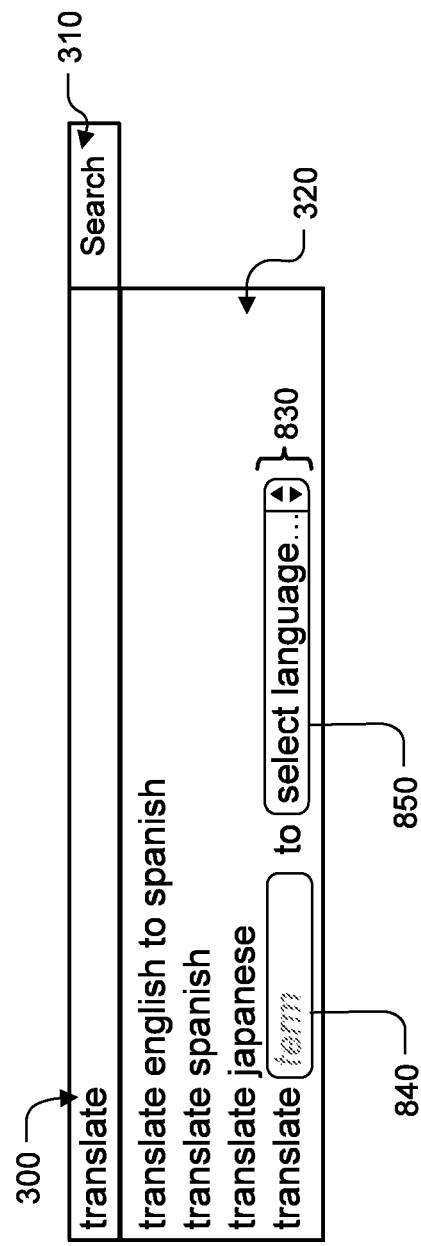

INTERACTIVE QUERY COMPLETION TEMPLATES

CROSS REFERENCE TO RELATED APPLICATIONS

This application claims the benefit of U.S. Provisional Application No. 61/605,014 filed on Feb. 29, 2012, entitled "Interactive Query Completion Templates," the disclosure of which is incorporated by reference herein in its entirety.

BACKGROUND

The present disclosure relates to information retrieval.

Information retrieval systems, such as Internet search engines, help users by retrieving information, such as web pages, images, text documents and multimedia content, in response to search queries. A search engine locates and stores the location of documents in a searchable index used to facilitate fast information retrieval. The search engine may use a variety of statistical measures to determine the relevance of the resources in the index to the user's query to identify and provide search results.

Formulating a search query that accurately represents the user's information need can be challenging. For example, a user may be unfamiliar with search query constructs, keywords and/or syntax that may be useful in obtaining search results relevant to the user's information need. In such a case, the user may submit a search query that includes query terms that are general or ambiguous to yield relevant search results. That is, the search engine may identify a number of resources which match terms in the user's query, but which are unrelated to the actual information need of the user. In such a case, the user may have to enter a number of different queries concerning the same information request before reaching resources that are of interest to the user.

SUMMARY

In one implementation, a method is described that includes identifying a partial query entered into a search field. The method further includes providing for display a query completion template for a category of information associated with one or more terms within the partial query. The query completion template includes an interactive field that is user editable. The method further includes identifying user interaction with the interactive field. The method further includes updating the display of the query completion template to include the results of the user interaction within the interactive field of the query completion template. The method further includes identifying user selection of the updated query completion template. The method further includes transmitting the updated display of the query completion template as a search query in response to the user selection.

This method and other implementations of the technology disclosed can each optionally include one or more of the following features.

The category of information can be one or more of language translation, stock price information, map information, navigational information, news information, weather information, travel information, or dictionary definitions.

The query completion template can further include one or more query terms within a non-editable field.

The method can further include identifying a set of query suggestions for the partial query. The set of query suggestions can then be modified to include the query completion template. Providing the query completion template for display can include providing for display the modified set of query suggestions.

This method can further include maintaining a database of query completion templates. Each query completion template in the database can be associated with a list of terms corresponding to a category of information. The method may further include identifying query terms within the set of query suggestions. The method may further include selecting the query completion template for display from the database of query completion templates based on one or more of the query terms within the set of query suggestions appearing within the list of terms associated with the selected query completion template.

The interactive field can be a text entry box. Identifying user interaction with the interactive field can include identifying user entry of a sequence of characters within the text entry box, the sequence of characters representing the one or more updated query terms within the interactive field.

The interactive field can be selectable to cause display of the one or more query terms. User interaction with the interactive field can then be identified by identifying user selection of the interactive field, and identifying the selection of one or more displayed query terms. Updating the display of the query completion template may comprise providing for display the selected one or more query terms within the interactive field in response to the user selection.

Providing for display the query completion template can include providing for display text indicating the category of information.

Providing for display the query completion template can include initially providing for display text within the interactive field.

Other implementations may include a non-transitory computer readable storage medium storing instructions executable by a processor to perform a method such as one or more of the methods described herein. Yet another implementation may include a system including memory and one or more processors operable to execute instructions, stored in the memory, to perform a method such as one or more of the methods described herein.

Particular implementations of the subject matter described herein provide an interactive query completion template that serves as a basis for creating a search query that can be used to obtain search results relevant to the information need of the user. The query completion template enables the quick and convenient creation of meaningful search queries by users that may otherwise be unfamiliar with the search query constructs, operators, terms and syntax that may be helpful in obtaining search results containing the information they seek.

Particular aspects of one or more implementations of the subject matter described in this specification are set forth in the drawings and the description below. Other features, aspects, and advantages of the subject matter will become apparent from the description, the drawings, and the claims.

BRIEF DESCRIPTION OF THE DRAWINGS

FIGS. 8A-B are screenshots illustrating an example query completion template that can be used to search for the translation of a term to another language.

DETAILED DESCRIPTION

Figure 1:
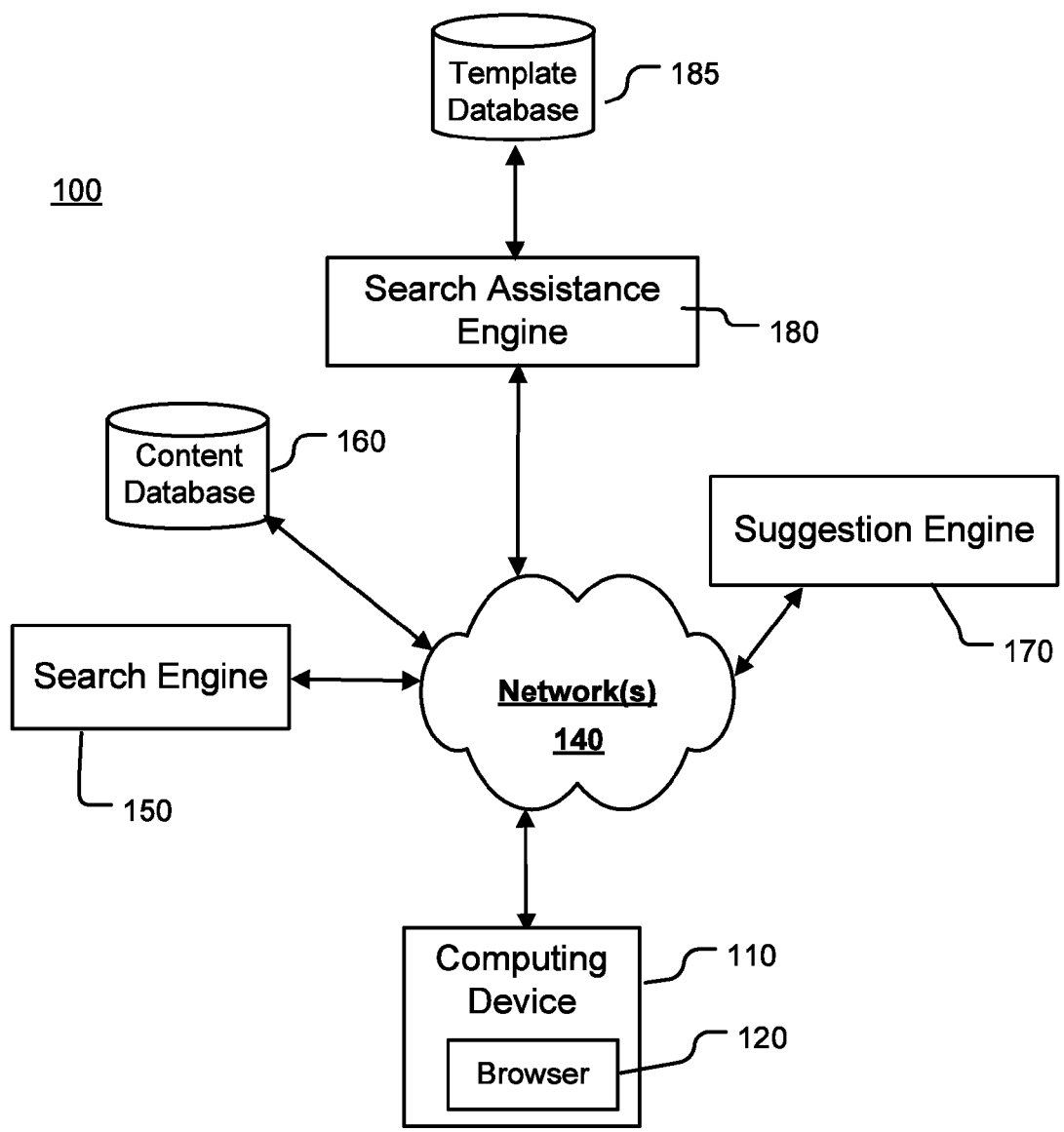
FIG. 1 illustrates a block diagram of an example environment for providing an interactive query completion template that can be used to search for content within a category of information.

Technology described herein provides an interactive query completion template that serves as a basis for creating a search query that can be used to obtain search results relevant to the information need of the user. The query completion template enables the quick and convenient creation of meaningful search queries by users that may otherwise be unfamiliar with the search query constructs, operators, terms and syntax that may be helpful in obtaining search results containing the information they seek.

The technology described herein includes providing an interactive query completion template for display as a user is typing a query. The query completion template has a query format that can be useful in efficiently searching for content within a category of information associated with one or more terms within the user's partial query. The query format defines the number, type and ordering of terms within a search query that is constructed using the query completion template. A query completion template thus represents a generalization of search queries representing searchable information within a corresponding category of information.

A query completion template includes at least one interactive field that is user-editable to enable the user to directly enter one or more query terms that represent the information the user is seeking. Prior to editing, the interactive field thus acts as a placeholder, so that the user can quickly and conveniently create a search query having the particular query format defined by the query completion template. After being edited, the user can then submit the edited query completion template as a search query to a search engine, so that useful search results can be obtained.

The interactive field may be for example a text entry box that allows the user to type or otherwise directly enter characters within the text entry box. For example, a query completion template for use in searching for the definition of a phrase may include a text entry box that allows the user to enter the phrase. As another example, a query completion template for use in tracking shipment of a package may include a text entry box that allows the user to enter a tracking number of the package. As yet another example, a query completion template for use in obtaining weather information may include a text entry box that allows the user to enter a city name and/or a zip code.

The interactive field may alternatively be a selection box that allows the user to select from among terms that may be particularly relevant or useful when searching for content within the category of information. For example, a query completion template for use in searching for flight information may include a selection box that allows the user to select from among a variety of possible airport codes. As another example, a query completion template for use in searching for a translation of a phrase into another language may include a selection box that allows the user to select from among a variety of possible languages.

A query completion template may also include one or more non-editable fields. A non-editable field can include one or more additional query terms that assist the user in obtaining search results relevant to the information of interest to the user. For example, when searching for the definition of a word, the query completion template may include the additional term "define" within a non-editable field, so that search results relevant to the definition of words (e.g. online dictionary web pages) are identified and returned by the search engine.

FIG. 1 illustrates a block diagram of an example environment for providing an interactive query completion template that can be used to search for content within a category of information. The environment 100 includes a client computing device 110 and a search engine 150. The environment 100 also includes a communication network (or networks) 140 that allows for communication between various components of the environment 100.

In one implementation, the network 140 includes the Internet. The network 140 can also utilize dedicated or private communication links that are not necessarily part of the Internet. In one implementation, the network 140 uses standard communications technologies, protocols, and/or inter-process communication technologies.

During operation, a user interacts with the search engine 150 through the use of the client computing device 110. The client computing device 110 and the search engine 150 each include memory for storage of data and software applications, a processor for accessing data and executing applications, and components that facilitate communication over the network 140.

The client computing device 110 executes an application, such as a web browser 120, which provides a search field that allows the user to formulate search queries and submit them to the search engine 150. The client computing device 110 may be for example a desktop computer, a laptop, a tablet computer, a mobile phone, or any other type of computing device.

The search engine 150 receives a submitted query from the client computing devices 110, and executes the query against a content database 160 of available documents such as web pages, images, text documents, and multimedia content. The search engine 150 identifies content in the content database 160 which matches the query, and responds by generating search results which are transmitted to the client computing device 110 in a form that can be presented to the user. For example, in response to a query from the client computing device 110, the search engine 150 may transmit a search results web page to be displayed in the web browser 120 executing on the client computing device 110.

During the query entry process, the web browser 120 or other application executing on the client computing device 110 also transmits partial queries being formulated by the user to a search assistance engine 180. The search assistance engine 180 may be implemented in hardware, firmware, or software running on hardware.

A "partial query" is a query formulated by a user prior to an indication by the user that the query is complete. A user may indicate completion of the query by entering a carriage return or equivalent character. As another example, the user may indicate completion of the query by selecting a search button in a user interface presented to the user during entry of the query. As yet another example, the user may indicate completion of the query by saying a command in a speech interface or pausing more than a predetermined period of time.

In some implementations, the application provides each character of a partial query as it is typed or otherwise entered by the user. In other implementations, the application provides multiple characters at a time following a pause between character entries.

Using the techniques described herein, the search assistance engine 180 provides an interactive query completion template having a query format useful in searching within a category of information associated with one or more terms within the partial query.

The search assistance engine 180 maintains a template database 185 of interactive query completion templates that correspond to different searchable categories of information. For example, the template database 185 may include an interactive query completion template that can be used to create a search query and efficiently search for airport flight information of interest to the user. As other examples, the template database 185 may include an interactive query completion template that can be used to search for unit conversion information, an interactive query completion template that can be used to search for the definition of a word or phrase, and an interactive query completion template that can be used to search for the translation of a term into another language. Other examples of interactive query completion templates include those that can be used to search for definitions, stocks, package tracking, weather, time zone information, medical definitions, time, unit conversions, etc.

A given interactive query completion template within the template database 185 has a query format that defines the number, type and ordering of terms within a search query formed using the given interactive query completion template. As described below, the given query completion template is used as the basis for creating a search query that represents a request for content within the corresponding category of information.

Each query completion template in the template database 185 includes at least one interactive field that allows the user to directly enter one or more query terms that represent the information the user is seeking. The interactive field thus acts as a placeholder, so that the user can quickly and conveniently create a search query having the format defined by the query completion template. As described in more detail below, after the editing by the user is complete, the user can then submit the edited query completion template as a search query to the search engine 150, so that search results can be obtained.

In response to a partial query, the search assistance engine 180 selects one or more interactive query completion templates within the template database 185. The selected interactive query completion template is for a category of information associated with one or more terms within the partial query. The techniques for determining which interactive query completion template (or templates) to select for a given partial query can vary from implementation to implementation.

The search assistance engine 180 may for example maintain a list of terms associated with each interactive query completion template in the template database 185. Terms in a given list may include terms that are particularly relevant or frequently used when searching for content within the corresponding category of information. For example, the list of terms associated with an interactive query completion template for use in searching for airport flight information may include keywords such as "flights", as well as airport names, airline names, flight numbers, etc. The search assistance engine 180 can then match terms within the partial query to the lists of terms to select one or more appropriate interactive query completion templates for the partial query.

These lists of terms may be generated and maintained by the search assistance engine 180 using a variety of different techniques. For example, the lists of terms may be created manually. Alternatively, other or additional techniques may be used to create the lists. In some implementations, the terms that have been manually included in a given list of terms serve as a starting point, or seed, for use in automatically identifying additional terms to include within the given list. These additional terms may for example be terms that have similar meanings to the manually included terms, such as synonyms of the manually included terms. As another example, these additional terms may have a high number of search results that overlap with the search results of one or more manually included terms.

Alternatively, other techniques may be used to select an interactive query completion template for the partial query. For example, in some implementations, the search assistance engine 180 selects an interactive query completion template by comparing the lists of terms to those within query suggestions provided by a suggestion engine 170. In such a case, the search assistance engine 180 forwards the partial query to the suggestion engine 170. The suggestion engine 170 includes memory for storage of data and software applications, a processor for accessing data and executing applications, and components that facilitate communication over communication network 140.

In response to the partial query, the suggestion engine 170 provides a set of query suggestions for the partial query to the search assistance engine 180. These query suggestions may for example be past queries submitted by prior users. These query suggestions represent search queries that the user may want to submit instead of the partial query actually being typed. The suggestion engine 170 may use conventional or other techniques to determine which query suggestions to include the set for the partial query. For example, the suggestion engine 170 may use prefix based matching. The suggestion engine 170 may also use other techniques to determine the query suggestions to include in the set.

The search assistance engine 180 can then compare the terms within the query suggestions provided by the suggestion engine 170 to the lists of terms associated with the interactive query completion templates. The search assistance engine 180 can then match terms within the query suggestions to the list of terms to select one or more interactive query completion template that are associated with lists that include one or more terms appearing within the query suggestions.

The search assistance engine 180 then provides the selected interactive query completion template for display on the client computing device 110. The selected interactive query completion template may for example be displayed within a cascaded drop down menu of the search field of an application, such as the web browser 120, executing on the client computing device 110 as the user is typing the query in the search field. Alternatively, the selected interactive query completion template may for example be displayed within a web page displayed in the web browser 120 or other application as the user is typing the query.

The interactive query completion templates may for example be implemented in JavaScript or other suitable programming language that provides the interactive functionality described herein.

In implementations in which the search assistance engine 180 obtains a set of query suggestions from the suggestion engine 170, the search assistance engine 180 may also provide the set of query suggestions for display along with the interactive query completion template. In such a case, the search assistance engine 180 can then modify the set of query suggestions by adding the selected interactive query completion template to the set. The search assistance engine 180 can then provide the modified set for display to the user of the client computing device 110. Alternatively, the search assistance engine 180 may provide the selected interactive query completion template to the suggestion engine 170. In such a case, the suggestion engine 170 may modify the set of query suggestions and provide the modified set for display to the user.

The techniques for adding the selected interactive query completion template to the set of query suggestions can vary from implementation to implementation. For example, the selected interactive query completion templates may be added to the beginning, before the query suggestions. As another example, the interactive query completion templates may be added to the end, after the query suggestions in the set. Alternatively, other techniques may be used to add the interactive query completion templates to the set. For example, the interactive query completion template may be added between query suggestions in the set.

The user of the client device 110 can then interact with the displayed query completion template to create a search query by performing various actions that correspond to entry of one or more query terms within at least one interactive field of the query completion template. The user may for example interact with the interactive query completion template using a keyboard, a pointing device such as a mouse, a touchscreen incorporated into the display of the client device 110, or any other user input device of the client device 110.

In response to the user's interaction, the search assistance engine 180 can then update the display of the interactive query completion template to include the entered one or more terms within the interactive field. Alternatively, the application displaying the query completion template may directly update the query completion template, without requiring further communication with the search assistance engine 180 to update the display.

Upon creating a search query using the query completion template, the user can then select it for submission as a search query to the search engine 150. The user may for example select the updated display of the interactive query completion template by clicking on it.

Upon selection, the search query is then transmitted to the search engine 150. In response, the search engine 150 may transmit a search results web page to be displayed in the web browser 120 executing on the client computing device 110. The search results web page may include a search result specific to the category of information. This search result may for example appear at the top of the search results web page (sometimes referred to as a "one-box" user interface), separate from other search results.

Figure 2:
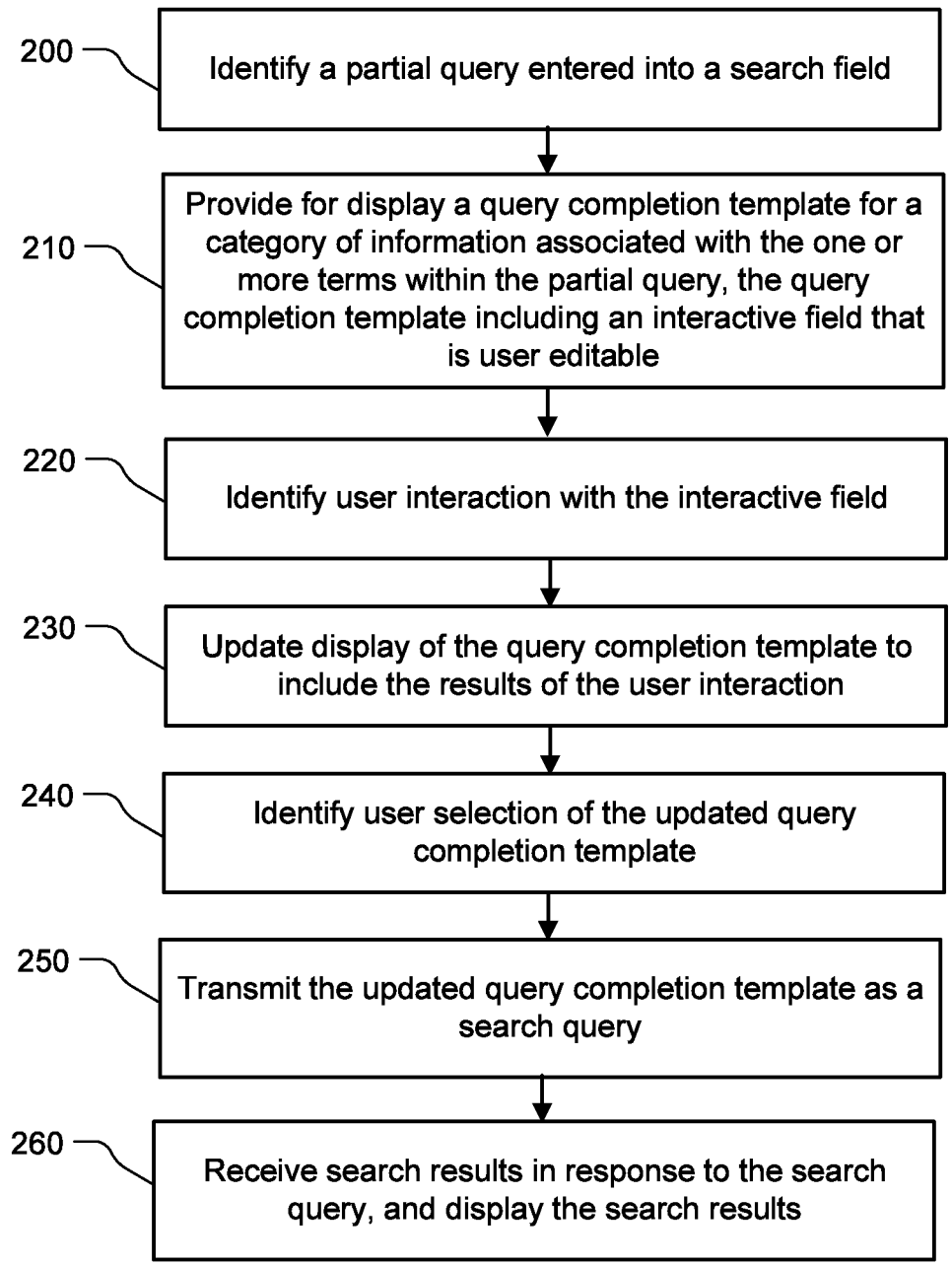
FIG. 2 illustrates a flow chart illustrating an example process for providing an interactive query completion template that can be used to search for content within a category of information.

FIG. 2 illustrates a flow chart illustrating an example process for providing an interactive query completion template that can be used to search for content within a category of information. Some implementations may perform the steps in different orders and/or perform different or additional steps than the ones illustrated in FIG. 2. For convenience, FIG. 2 will be described with reference to a system of one or more computers that performs the process. The system can be, for example, the search assistance engine 180 in conjunction with an application executing on a client computing device as described above with reference to FIG. 1.

At step 200, the system receives a partial query entered into a search field of an application executing on a client computing device. At step 210, the system displays a query completion template for a category of information associated with one or more terms within the partial query. The query completion template has a query format for searching content within the category of information. The query completion template also includes an interactive field that is user editable. The displayed query completion template may for example be selected using the techniques described above.

At step 220, the system receives user interaction with the interactive field. The user interaction corresponds to entry of one or more terms within the interactive field.

At step 230, the system updates the display of the query completion template to include the entered one or more query terms. At step 240, the system receives user selection of the updated display of the query completion template. The user selection corresponds to a request to submit the updated query completion template as a search query.

At step 250, the system transmits the updated query completion template as a search query to a search engine. At step 260, the system receives search results in response to the search query. The system then displays the search results.

Figure 3:
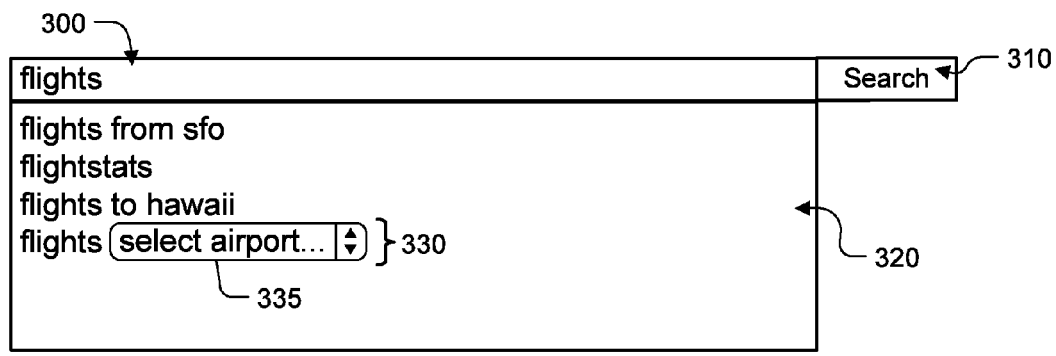
FIG. 3 is a screenshot illustrating an example query completion template that can be used to search for airport flight information.

FIG. 3 is a screenshot illustrating an example interactive query completion template 330 that can be used to search for airport flight information. In this example, the screenshot includes a search field 300 and a search button 310. In this example, while the user is entering the partial query "flights" into the search field 300, a cascaded drop down menu 320 is displayed. In this example, the drop down menu 320 includes an interactive query completion template 330 that can be used to search for flight information.

The query format of the interactive query completion template 330 in this example is of the form:

[flights] ['airport code']

where "flights" is predetermined text within a non-editable field, and the 'airport code' is entered by the user using an interactive field 335.

In this example the interactive field 335 is a selection box that allows the user to select a desired airport code from among a list of airport codes. The interactive field 335 includes the initial text "select airport . . . " to notify the user that the interactive field 335 can be edited. The user can click on the interactive field 335 to display a window with a list of airport codes that can then be selected by the user. The user can then click on the airport code for the airport of interest to the user, and the airport code can then be displayed within the interactive field 335. Upon editing the query completion template 330, the user can then click on it to submit it as a search query, so that search results including flight information for the desired airport can be obtained from the search engine 150.

Figure 4:
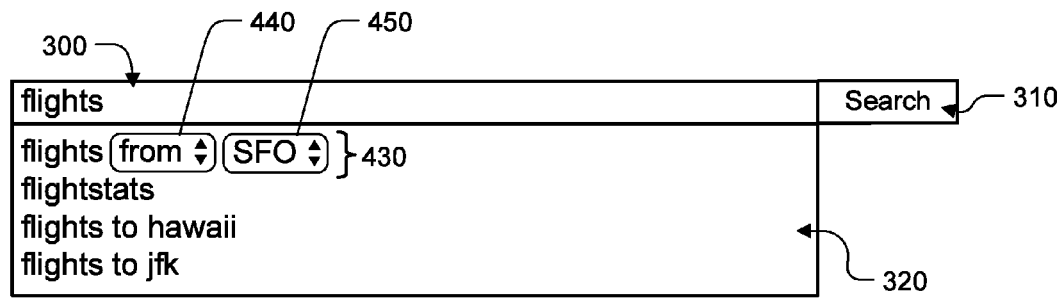
FIG. 4 is a screenshot illustrating a second example query completion template that can be used to search for airport flight information.

FIG. 4 is a screenshot illustrating a second example query completion template 430 that can be used to search for flight information. The query format of the interactive query completion template 430 in this example is of the form:

[flights] ['to|from'] ['airport code']

where "flights" is predetermined text within a non-editable field, the 'to|from' is entered by the user using a first interactive field 440 so that either departing or arrival flight information can be obtained, and the 'airport code' is entered by the user using a second interactive field 450.

The first interactive field 440 is selectable by the user to select either the term "from" or the term "to" for inclusion within the field 440, in order to search for either departure or arrival flight information. The user can click on the interactive field 450 to display a window with a list of airport codes that can be selected by the user. Upon creating a search query using the interactive query completion template 430, the user can then submit it by clicking on it, so that search results including departure or arrival flight information for the desired airport can be obtained from the search engine 150.

Figure 5:
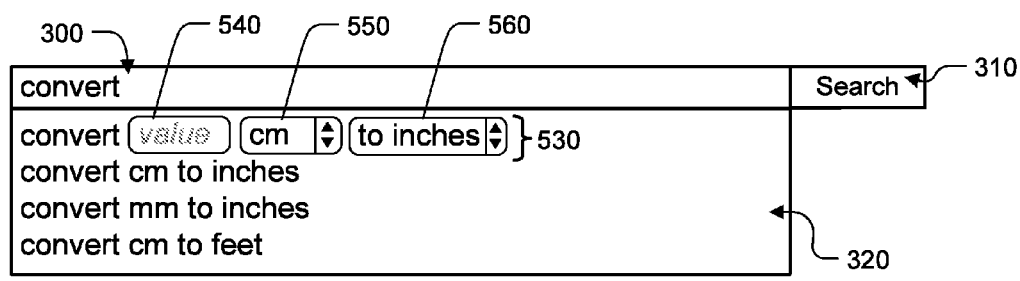
FIG. 5 is a screenshot illustrating an example query completion template that can be used to search for unit conversion information

FIG. 5 is a screenshot illustrating an example query completion template 530 that can be used to search for unit conversion information. In this example, while the user is entering the partial query "convert" into the search field 300, the drop down menu 320 includes an interactive query completion template 530 that can be used to search for unit conversion information.

The query format of the interactive query completion template 530 in this example is of the form:
[convert] ['value'] ['unit1'] [to 'unit2']
where "convert" is predetermined text within a non-editable field, 'value' is a numerical value entered by the user using an interactive field 540, 'unit1' is the unit that the entered numerical value will be converted from and is selected by the user using the editable field 550, and 'unit2' is the unit that the entered numerical value will be converted into and is selected by the user using an interactive field 560. In this example, the interactive field 540 is a text entry box, so that the user can type or otherwise enter a sequence of characters representing the numerical value to be converted.

The interactive field 550 in this example is a selection box 550 that the user can click on to display a window with a list of units that the entered numerical value will be converted from. The user can then select the appropriate unit from the list within the window. Similarly, the user can click on the selection box 560 to display a window with a list of units that the entered numerical value will be converted into.

Figure 6:
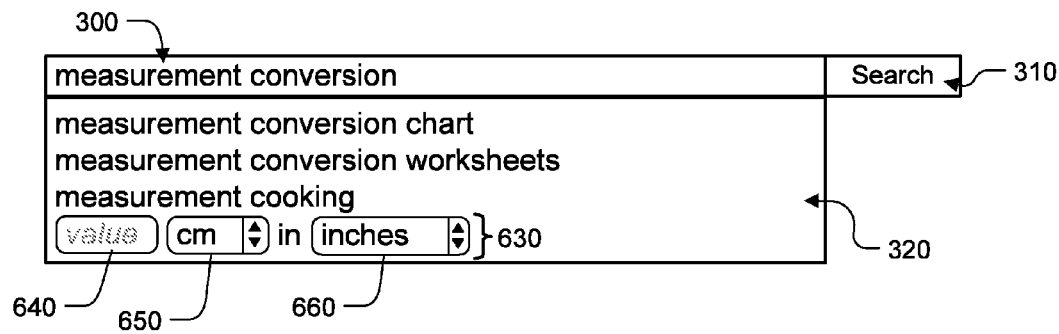
FIG. 6 is a screenshot illustrating a second example query completion template that can be used to search for unit conversion information.

FIG. 6 is a screenshot illustrating a second example query completion template 630 that can be used to search for unit conversion information. In this example, while the user is entering the partial query "measurement conversion" into the search field 300, the drop down menu 320 includes the interactive query completion template 630.

The query format of the interactive query completion template 630 in this example is of the form:
['value'] ['unit1'] [in] ['unit 2]
where the 'value' is a numerical value entered by the user using a text entry box 640, 'unit1' is the unit that the numerical value will be converted from and is selected by the user using the selection box 650, "in" is predetermined text within a non-editable field, and 'unit2' is the unit that the numerical value will be converted into and is selected by the user using the selection box 660.

Figure 7A:
FIGS. 7A-7B are screenshots illustrating an example query completion template that can be used to search for the definition of a term.
Figure 7B:
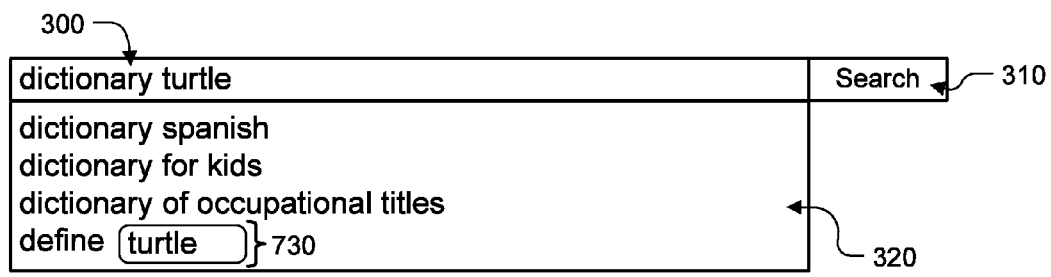

FIGS. 7A-7B are screenshots illustrating an example query completion template 730 that can be used to search for the definition of a term. In the example shown in FIG. 7A, while the user is entering the partial query "dictionary" into the search field 300, the drop down menu 320 includes the interactive query completion template 730.

The query format of the interactive query completion template 730 is of the form:
[define] ['term']
where "define" is predetermined text within a non-editable field, and 'term' is a term entered by the user using a text box 740.

FIG. 7B is an example screenshot after the user has entered term 'turtle' within the text box 740 in FIG. 7A. As shown in FIG. 7B, in this example the search field 300 is updated to include the characters that have been entered into the text box 740 by the user.

Figure 8B:
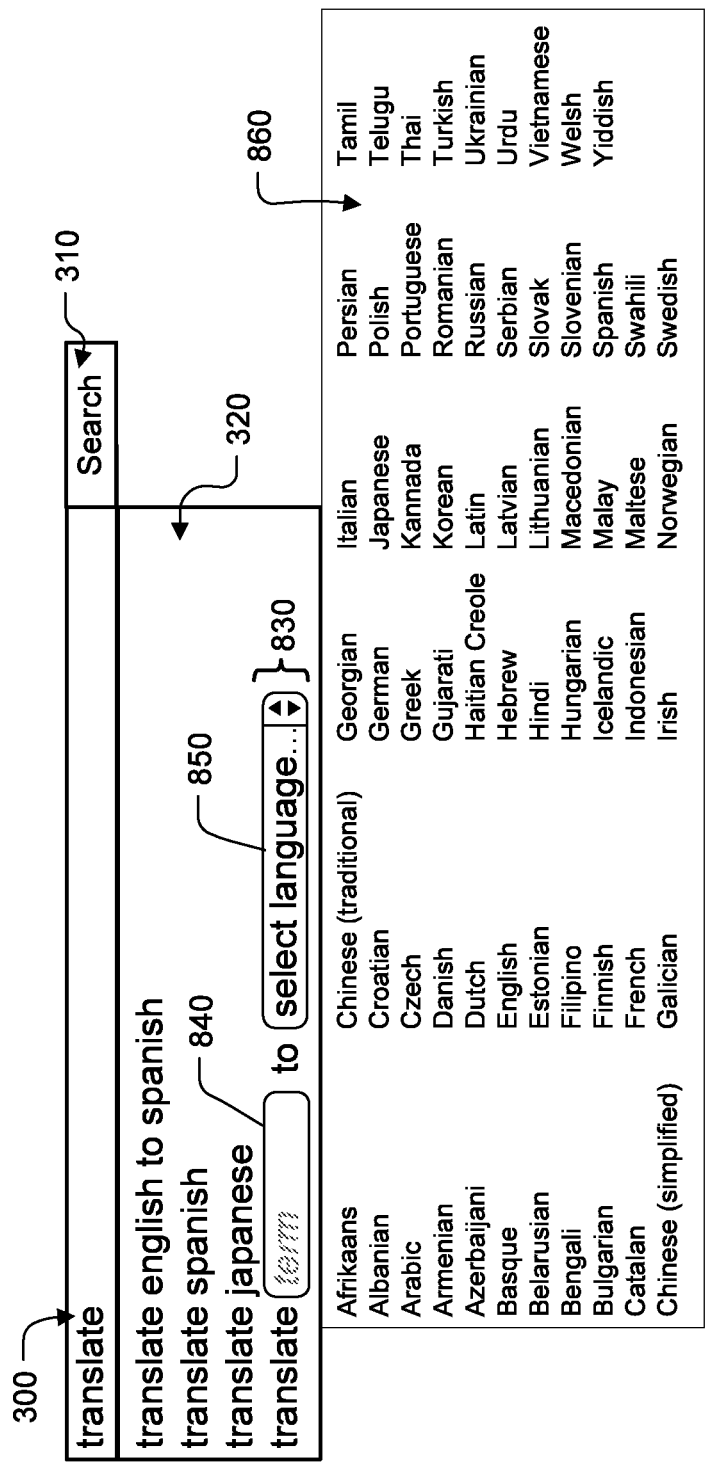

FIGS. 8A-8B are screenshots illustrating an example query completion template that can be used to search for the translation of a term into another language. As shown in FIG. 8A, while the user is entering the partial query "translate" into the search field 300, the drop down menu includes an interactive query completion template 830 that can be used to search for the translation of a term.

The query format of the interactive query completion template 830 in this example is of the form:
[translate] ['term'] [to] ['language']
where "translate" is predetermined text within a non-editable field, 'term' is a term in English to be translated and is entered by the user using a text box 840, "to" is predetermined text within a non-editable field, 'language' is the language the term is to be translated into and is entered by the user using a selection box 850.

FIG. 8B is an example screenshot after the user has clicked on the selection box 850 in FIG. 8A. As shown in FIG. 8B, upon clicking on the selection box 850, a window 860 is displayed that includes a list of languages that can be selected by the user. The user can then click on the desired language within the window 860, and the selection box 850 can then be updated to include the selected language.

Figure 9:
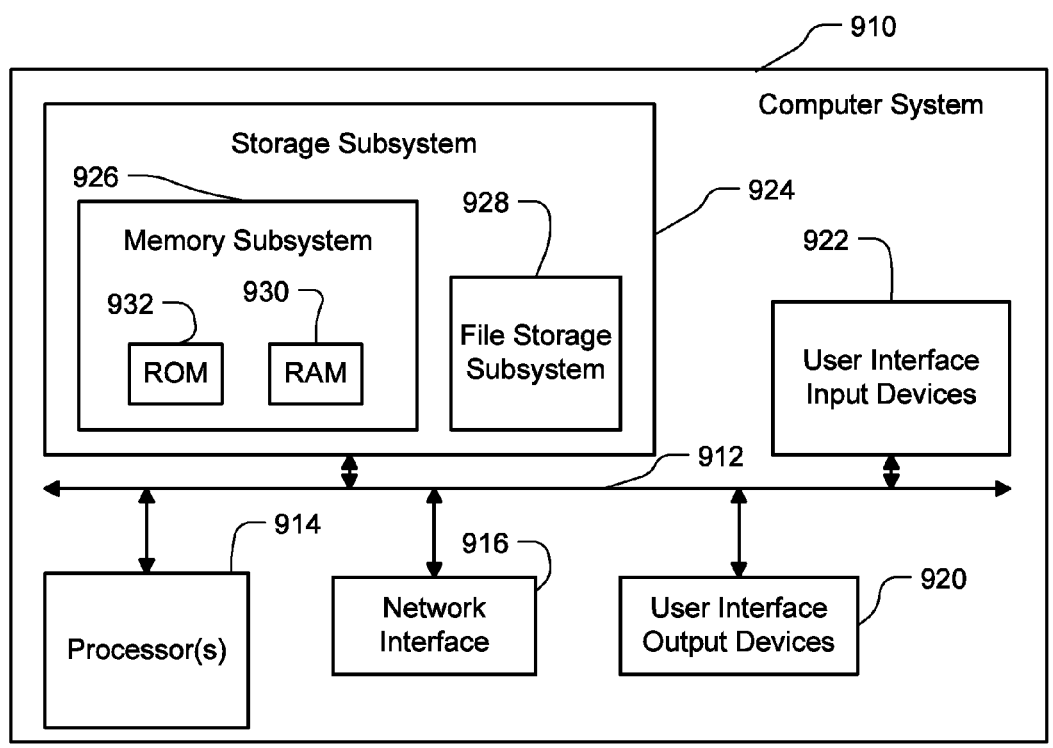
FIG. 9 is a block diagram of an example computer system.

FIG. 9 is a block diagram of an example computer system. Computer system 910 typically includes at least one processor 914 which communicates with a number of peripheral devices via bus subsystem 912. These peripheral devices may include a storage subsystem 924, comprising for example memory devices and a file storage subsystem, user interface input devices 922, user interface output devices 920, and a network interface subsystem 916. The input and output devices allow user interaction with computer system 910. Network interface subsystem 916 provides an interface to outside networks, including an interface to communication network 140, and is coupled via communication network 140 to corresponding interface devices in other computer systems.

User interface input devices 922 may include a keyboard, pointing devices such as a mouse, trackball, touchpad, or graphics tablet, a scanner, a touchscreen incorporated into the display, audio input devices such as voice recognition systems, microphones, and other types of input devices. In general, use of the term "input device" is intended to include all possible types of devices and ways to input information into computer system 910 or onto communication network 140.

User interface output devices 920 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 910 to the user or to another machine or computer system.

Storage subsystem 924 stores programming and data constructs that provide the functionality of some or all of the modules described herein, including the logic to provide an interactive query completion template useful in searching within a category of information according to the processes described herein. These software modules are generally executed by processor 914 alone or in combination with other processors.

Memory subsystem 926 used in the storage subsystem can include a number of memories including a main random access memory (RAM) 930 for storage of instructions and data during program execution and a read only memory (ROM) 932 in which fixed instructions are stored. A file storage subsystem 928 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 928 in the storage subsystem 924, or in other machines accessible by the processor.

Bus subsystem 912 provides a mechanism for letting the various components and subsystems of computer system 910 communicate with each other as intended. Although bus subsystem 912 is shown schematically as a single bus, alternative embodiments of the bus subsystem may use multiple busses.

Computer system 910 can be of varying types including a workstation, server, computing cluster, blade server, server farm, or any other data processing system or computing device. Due to the ever-changing nature of computers and networks, the description of computer system 910 depicted in FIG. 9 is intended only as a specific example for purposes of illustrating the preferred embodiments. Many other configurations of computer system 910 are possible having more or fewer components than the computer system depicted in FIG. 9.

While the present invention is disclosed by reference to the preferred embodiments and examples detailed above, it is understood that these examples are intended in an illustrative rather than in a limiting sense. Computer-assisted processing is implicated in the described embodiments. Accordingly, the present invention may be embodied in methods for providing an interactive query completion template useful in searching within a category of information, systems including logic and resources to provide an interactive query completion template useful in searching within a category of information, systems that take advantage of computer-assisted methods for providing an interactive query completion template useful in searching within a category of information, media impressed with logic to provide an interactive query completion template useful in searching within a category of information, data streams impressed with logic to provide an interactive query completion template useful in searching within a category of information, or computer-accessible services that carry out computer-assisted methods for providing an interactive query completion template useful in searching within a category of information. It is contemplated that modifications and combinations will readily occur to those skilled in the art, which modifications and combinations will be within the scope of the following claims.

We claim as follows:

1. A method comprising:
   identifying a partial query entered into a search field;
   providing for display a query completion template, the query completion template provided for display in response to identifying the partial query and being for a category of information associated with one or more terms within the partial query, the query completion template including an interactive field that is user editable and including one or more additional fields, the query completion template defining the number of terms, type of terms, and ordering of terms within a search query formed using the query template;
   identifying user interaction with the interactive field;
   updating the display of the query completion template to include the results of the user interaction within the interactive field of the query completion template;
   identifying user selection of the updated query completion template; and
   transmitting the updated display of the query completion template as a search query in response to the user selection, the search query including one or more query terms that are based on the results of the user interaction with the interactive field and one or more additional query terms based on the one or more additional fields, the one or more query terms and the one or more additional query terms being ordered based on the ordering of terms defined by the query completion template.

2. The method of claim 1, wherein the category of information is one or more of language translation, stock price information, map information, navigational information, news information, weather information, travel information, or dictionary definitions.

3. The method of claim 1, wherein the one or more additional fields includes a non-editable field and the one or more additional query terms are defined for the non-editable field.

4. The method of claim 1, further comprising:
   identifying a set of query suggestions for the partial query; and
   modifying the set of query suggestions to include the query completion template, and wherein providing for display the query completion template includes providing for display the modified set of query suggestions.

5. The method of claim 4, further comprising
   maintaining a database of query completion templates, wherein each query completion template in the database is associated with a list of terms corresponding to a category of information;
   identifying query terms within the set of query suggestions; and
   selecting the query completion template for display from the database of query completion templates based on one or more of the query terms within the set of query suggestions appearing within the list of terms associated with the selected query completion template.

6. The method of claim 1, wherein the interactive field is a text entry box and identifying user interaction with the interactive field includes identifying user entry of a sequence of characters within the text entry box, the sequence of characters representing the one or more query terms that are based on the results of the user interaction with the interactive field.

7. The method of claim 1, wherein:
   the interactive field is selectable to cause display of the one or more query terms and additional interactive field query terms;
   identifying user interaction with the interactive field includes identifying user selection of the interactive field and identifying the selection of the one or more query terms within the interactive field; and
   wherein updating the display of the query completion template comprises providing for display the selected one or more query terms within the interactive field in response to the user selection.

8. The method of claim 1, wherein providing for display the query completion template includes providing for display text indicating the category of information.

9. The method of claim 1, wherein providing for display the query completion template includes initially providing for display text within the interactive field.

10. A system including memory and one or more processors operable to execute instructions, stored in the memory, comprising instructions to perform the operations of:
    identifying a partial query entered into a search field;

providing for display a query completion template, the query completion template provided for display in response to identifying the partial query and being for a category of information associated with one or more terms within the partial query, the query completion template including an interactive field that is user editable and including one or more additional fields, the query completion template defining the number of terms, type of terms, and ordering of terms within a search query formed using the query template;

identifying user interaction with the interactive field;

updating the display of the query completion template to include the results of the user interaction within the interactive field of the query completion template;

identifying user selection of the updated query completion template; and transmitting the updated display of the query completion template as a search query in response to the user selection, the search query including one or more query terms that are based on the results of the user interaction with the interactive field and one or more additional query terms based on the one or more additional fields, the one or more query terms and the one or more additional query terms being ordered based on the ordering of terms defined by the query completion template.

11. The system of claim 10, wherein the category of information is one or more of language translation, stock price information, map information, navigational information, news information, weather information, travel information, or dictionary definitions.

12. The system of claim 10, wherein the one or more additional fields includes a non-editable field and the one or more additional query terms are defined for the non-editable field wherein the query completion template further includes one or more query terms within a non editable field.

13. The system of claim 10, further comprising instructions to perform the operations of:

identifying a set of query suggestions for the partial query; and modifying the set of query suggestions to include the query completion template, and wherein the instructions to perform the operations of providing for display the query completion template include instructions to perform the operations of providing for display the modified set of query suggestions.

14. The system of claim 13, further comprising instructions to perform the operations of:

maintaining a database of query completion templates, wherein each query completion template in the database is associated with a list of terms corresponding to a category of information;

identifying query terms within the set of query suggestions; and selecting the query completion template for display from the database of query completion templates based on one or more of the query terms within the set of query suggestions appearing within the list of terms associated with the selected query completion template.

15. The system of claim 10, wherein the interactive field is a text entry box and the instructions to perform the operations of identifying user interaction with the interactive field include instructions to perform the operations of identifying user entry of a sequence of characters within the text entry box, the sequence of characters representing the one or more query terms that are based on the results of the user interaction with the interactive field.

16. The system of claim 10, wherein:

the interactive field is selectable to cause display of the one or more query terms and additional interactive field query terms;

identifying user interaction with the interactive field includes identifying user selection of the interactive field and identifying the selection of the one or more query terms within the interactive field; and wherein updating the display of the query completion template comprises providing for display the selected one or more query terms within the interactive field in response to the user selection.

17. The system of claim 10, wherein providing for display the query completion template includes providing for display text indicating the category of information.

18. The system of claim 10, wherein providing for display the query completion template includes initially providing for display text within the interactive field.

19. A non-transitory computer readable storage medium storing computer instructions executable by a processor to perform a method comprising:

identifying a partial query entered into a search field;

providing for display a query completion template, the query completion template provided for display in response to identifying the partial query and being for a category of information associated with one or more terms within the partial query, the query completion template including an interactive field that is user editable and including one or more additional fields, the query completion template defining the number of terms, type of terms, and ordering of terms within a search query formed using the query template;

identifying user interaction with the interactive field;

updating the display of the query completion template to include the results of the user interaction within the interactive field of the query completion template;

identifying user selection of the updated query completion template; and transmitting the updated display of the query completion template as a search query in response to the user selection, the search query including one or more query terms that are based on the results of the user interaction with the interactive field and one or more additional query terms based on the one or more additional fields, the one or more query terms and the one or more additional query terms being ordered based on the ordering of terms defined by the query completion template.

20. The non-transitory computer readable storage medium of claim 19, wherein the category of information is one or more of language translation, stock price information, map information, navigational information, news information, weather information, travel information, or dictionary definitions.

21. The non-transitory computer readable storage medium of claim 19, wherein the one or more additional fields includes a non-editable field and the one or more additional query terms are defined for the non-editable field.

22. The non-transitory computer readable storage medium of claim 19, further comprising:

identifying a set of query suggestions for the partial query; and modifying the set of query suggestions to include the query completion template, and wherein providing for display the query completion template includes providing for display the modified set of query suggestions.

23. The non-transitory computer readable storage medium of claim 22, further comprising:

maintaining a database of query completion templates, wherein each query completion template in the database is associated with a list of terms corresponding to a category of information;

identifying query terms within the set of query suggestions; and selecting the query completion template for display from the database of query completion templates based on one or more of the query terms within the set of query suggestions appearing within the list of terms associated with the selected query completion template.

24. The non-transitory computer readable storage medium of claim 19, wherein the interactive field is a text entry box and identifying user interaction with the interactive field includes identifying user entry of a sequence of characters within the text entry box, the sequence of characters representing the one or more query terms that are based on the results of the user interaction with the interactive field.

25. The non-transitory computer readable storage medium of claim 19, wherein:

the interactive field is selectable to cause display of the one or more query terms and additional interactive field query terms;

identifying user interaction with the interactive field includes identifying user selection of the interactive field and identifying the selection of the one or more query terms within the interactive field; and wherein updating the display of the query completion template comprises providing for display the selected one or more query terms within the interactive field in response to the user selection.

26. The non-transitory computer readable storage medium of claim 19, wherein providing for display the query completion template includes providing for display text indicating the category of information.

27. The non-transitory computer readable storage medium of claim 19, wherein providing for display the query completion template includes initially providing for display text within the interactive field.

* * * * *